United States Patent
Regev

(10) Patent No.: US 8,571,032 B2
(45) Date of Patent: Oct. 29, 2013

(54) TESTING PACKET FRAGMENTATION

(75) Inventor: Alon Regev, Woodland Hills, CA (US)

(73) Assignee: Ixia, Calabasas, FL (US)

( * ) Notice: Subject to any disclaimer, the term of this patent is extended or adjusted under 35 U.S.C. 154(b) by 373 days.

(21) Appl. No.: 12/948,567

(22) Filed: Nov. 17, 2010

(65) Prior Publication Data
US 2012/0120819 A1   May 17, 2012

(51) Int. Cl.
*H04L 12/28* (2006.01)
*H04L 12/56* (2011.01)
*H04J 3/00* (2006.01)
*H04J 3/24* (2006.01)

(52) U.S. Cl.
USPC .................. 370/392; 370/473; 370/476

(58) Field of Classification Search
None
See application file for complete search history.

(56) References Cited

U.S. PATENT DOCUMENTS

| | | | |
|---|---|---|---|
| 5,343,463 A | 8/1994 | van Tetering et al. | |
| 5,477,531 A | 12/1995 | McKee | |
| 5,600,632 A | 2/1997 | Schulman | |
| 5,878,032 A | 3/1999 | Mirek et al. | |
| 6,028,847 A | 2/2000 | Beanland | |
| 6,172,989 B1 | 1/2001 | Yanagihara | |
| 6,233,256 B1 | 5/2001 | Dieterich et al. | |
| 6,252,891 B1 | 6/2001 | Perches | |
| 6,360,332 B1 | 3/2002 | Weinberg | |
| 6,446,121 B1 | 9/2002 | Shah | |
| 6,545,979 B1 | 4/2003 | Poulin | |
| 6,601,098 B1 | 7/2003 | Case et al. | |
| 6,717,917 B1 | 4/2004 | Weissberger et al. | |
| 6,728,929 B1 | 4/2004 | Luong | |
| 6,789,100 B2 | 9/2004 | Nemirovsky et al. | |
| 6,888,818 B1 | 5/2005 | Gubbi | |
| 6,950,405 B2 | 9/2005 | Van Gerrevink | |
| 7,406,089 B1 | 7/2008 | Rahim et al. | |
| 7,561,559 B2 | 7/2009 | Hannel et al. | |
| 7,680,118 B2 * | 3/2010 | Zegers et al. | 370/394 |
| 2004/0052259 A1 | 3/2004 | Garcia | |
| 2005/0129020 A1 * | 6/2005 | Doyle et al. | 370/392 |
| 2005/0204170 A1 * | 9/2005 | Belenky et al. | 713/201 |
| 2005/0281287 A1 * | 12/2005 | Niinomi et al. | 370/474 |
| 2005/0281392 A1 | 12/2005 | Weeks et al. | |
| 2005/0286564 A1 | 12/2005 | Hatley et al. | |
| 2006/0088060 A1 | 4/2006 | Fujikami et al. | |
| 2007/0064738 A1 * | 3/2007 | Takagi et al. | 370/473 |
| 2007/0115833 A1 | 5/2007 | Pepper et al. | |
| 2008/0112332 A1 | 5/2008 | Pepper | |

OTHER PUBLICATIONS

European Patent Office, European Search Report for European Application No. 11009068.5, mail date Jan. 27, 2012, pp. 1-7.

* cited by examiner

*Primary Examiner* — Xavier S. Wong
(74) *Attorney, Agent, or Firm* — SoCal IP Law Group LLP; John E. Gunther; Steven C. Sereboff

(57) ABSTRACT

Methods and apparatus for testing a network that converts datagrams into fragments. A traffic generator may generate a datagram containing plural instrumentation blocks and transmit the test traffic over the network. A traffic receiver may determine if a plurality of fragments received via the network constitutes a complete datagram based, at least in part, on data within respective instrumentation blocks extracted from each received fragment. The traffic receiver may report test statistics indicative of a number of complete datagrams received and a number of incomplete datagrams received.

15 Claims, 9 Drawing Sheets

TESTING PACKET FRAGMENTATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This application is related to a copending patent application entitled TESTING FRAGMENT REASSEMBLY filed on the same date as the present application.

BACKGROUND

1. Field

This disclosure relates to testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final or intermediate destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, and 3 of the structure are the physical layer, the data link layer, and the network layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as WiFi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

The IPv4 and IPv6 layer 3 protocols also provide for packet fragmentation and reassembly. A network device may fragment an original packet into two or more shorter packets, which may be subsequently reassembled into the original packet by some other network device. Packet fragmentation and reassembly may be necessary, for example, if a device or path within a network has a maximum allowable packet length that is shorter than the original packet. Packet fragmentation and reassembly may also be used to divide a long data packet into fragments that can be transmitted between periodically scheduled voice or video packets. In keeping with the terminology of IPv4, an original packet to be fragmented will be referred to herein as a "datagram". Each datagram may be divided into a plurality of "fragments". Note that both datagrams and fragments are packets as previously defined.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at one or more destination ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses.

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

For the purpose of collecting test data, the test traffic may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic may be organized into flows, where a "flow" is any plurality of packets for which network traffic statistics are reported. Each flow may consist of a single packet group or a small plurality of packet groups. Each packet group may typically belong to a single flow.

Within this description, the term "engine" means a collection of hardware, which may be augmented by firmware and/or software, which performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable hardware device such as a field programmable gate array (FPGA), a programmable logic device (PLD), or a programmable logic arrays (PLA). The gate netlist or other physical description may be converted into process instructions and masks for fabricating the engine within an application specific integrated circuit (ASIC).

Within this description, the term "logic" also means a collection of hardware that performs a described function, which may be on a smaller scale than an "engine". "Logic" encompasses combinatorial logic circuits; sequential logic circuits which may include flip-flops, registers and other data storage elements; and complex sequential logic circuits such as finite-state machines.

Within this description, a "unit" also means a collection of hardware, which may be augmented by firmware and/or software, which may be on a larger scale than an "engine". For example, a unit may contain multiple engines, some of which may perform similar functions in parallel. The terms "logic", "engine", and "unit" do not imply any physical separation or demarcation. All or portions of one or more units and/or engines may be collocated on a common card, such as a network card or blade, or within a common FPGA, ASIC, or other circuit device.

Throughout this description, elements appearing in block diagrams are assigned three-digit reference designators, where the most significant digit is the figure number where the element is introduced and the two least significant digits are specific to the element. An element that is not described in conjunction with a block diagram may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
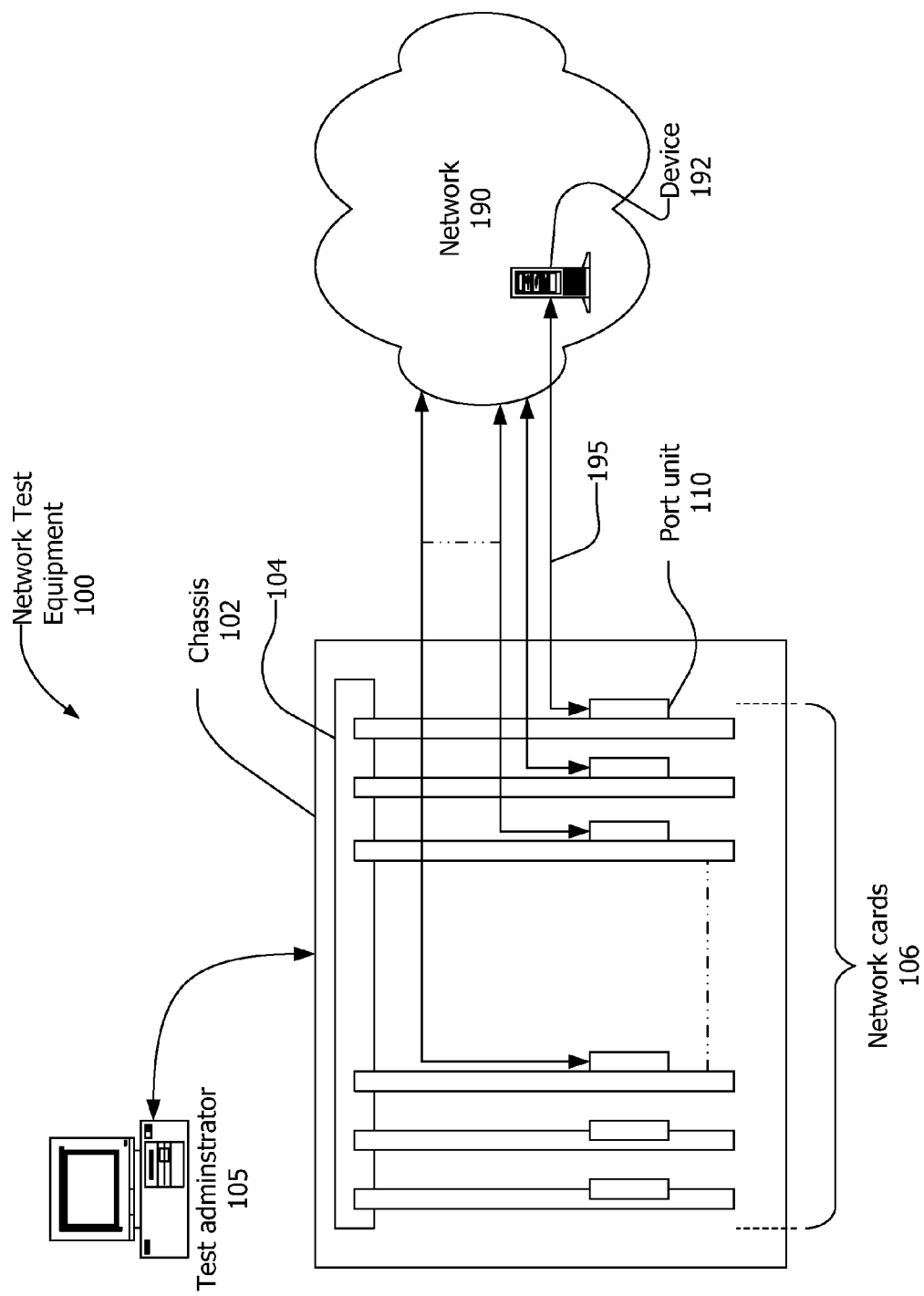
FIG. 1 is a block diagram of a network environment.

FIG. 1 shows a block diagram of a network environment. The environment may include network test equipment 100, and a network 190 including one or more network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more application specific integrated circuits (ASICs), processors, and other kinds of devices. The network cards 106 may include one or more programmable hardware devices such as field programmable gate arrays (FPGAs), programmable logic devices (PLDs), programmable logic arrays (PLAs). In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may contain one or more port unit 110. Each port unit 110 may connect to the network 190 through one or more ports. The port units 110 may be connected to the network 190 through a communication medium 195, which may be a wire, an optical fiber, a wireless link, or other communication medium. Each network card 106 may support a single communications protocol, may support a number of related protocols, or may support a number of unrelated protocols. The network cards 106 may be permanently installed in the network test equipment 100 or may be removable.

The backplane 104 may serve as a bus or communications medium for the network cards 106. The backplane 104 may also provide power to the network cards 106.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel. Each port unit 110 may be connected, via a specific communication medium 195, to a corresponding port on a network device 192.

Figure 2:
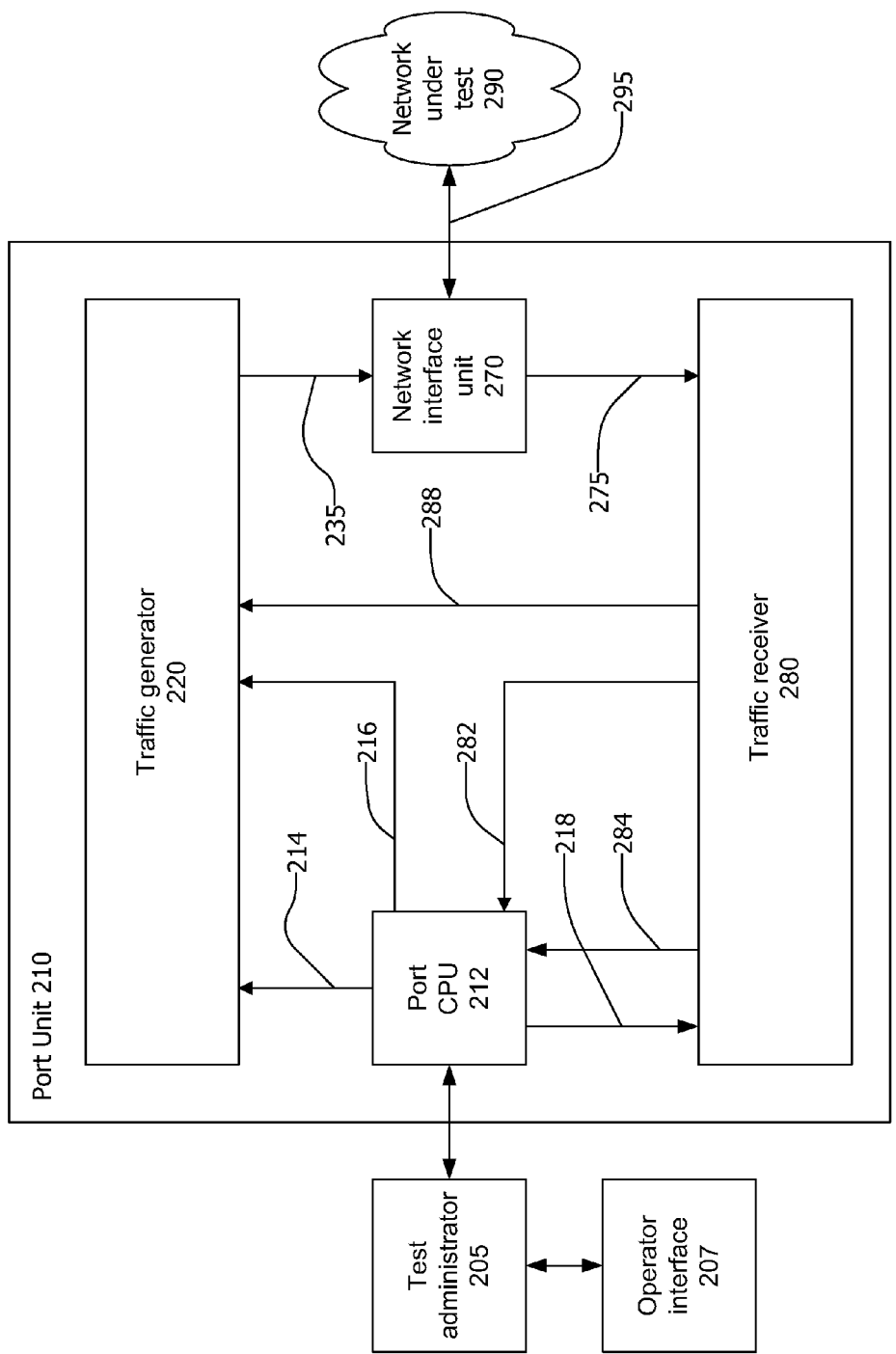
FIG. 2 is a block diagram of a network card.

Referring now to FIG. 2, an exemplary port unit 210 may include a port processor 212, a traffic generator unit 220, a traffic receiver unit 280, and a network interface unit 270 which couples the port unit 210 to a network under test 290. The port unit 210 may be all or part of a network card such as the network cards 106. The network under test 290 may be one or more network devices such as the network device 194, and/or all or portion of a network such as the network 190.

The port processor 212 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port processor 212 may communicate with a test administrator 205 which may be coupled to an operator interface 207. The test administrator 205 may be a computing device contained within, or external to, the network test equipment 100. The test administrator 205 may provide the port processor 212 with instructions and data required for the port unit to participate in testing the network 290. The instructions and data received from the test administrator 205 may include, for example, definitions of packet streams to be generated by the port unit 210 and definitions of performance statistics that may be accumulated and reported by the port unit 210.

The port processor 212 may provide the traffic generator unit 220 with stream forming data 214 to form a plurality of streams. The stream forming data 214 may include, for example, the type of packet, the frequency of transmission, definitions of fixed and variable-content fields within the packet and other information for each packet stream. The traffic generator unit 220 may then generate the plurality of streams in accordance with the stream forming data 214. The plurality of streams may be interleaved to form outgoing test traffic 235. Each of the streams may include a sequence of packets. The packets within each stream may be of the same general type but may vary in length and content.

The network interface unit 270 may convert the outgoing test traffic 235 from the traffic generator unit 220 into the electrical, optical, or wireless signal format required to transmit the test traffic to the network under test 290 via a link 295, which may be a wire, an optical fiber, a wireless link, or other communication link. Similarly, the network interface unit 270 may receive electrical, optical, or wireless signals from the network over the link 295 and may convert the received signals into incoming test traffic 275 in a format usable to the traffic receiver unit 280.

The traffic receiver unit 280 may receive the incoming test traffic 275 from the network interface unit 270. The traffic receiver unit 280 may determine if each received packet is a member of a specific flow, and may accumulate test statistics for each flow in accordance with test instructions 218 provided by the port processor 212. The accumulated test statistics may include, for example, a total number of received packets, a number of packets received out-of-sequence, a number of received packets with errors, a maximum, average, and minimum propagation delay, and other statistics for each flow. The traffic receiver unit 280 may also capture and store specific packets in accordance with capture criteria included in the test instructions 218. The traffic receiver unit 280 may provide test statistics and/or captured packets 284 to the port processor 212, in accordance with the test instructions 218, for additional analysis during, or subsequent to, the test session.

The outgoing test traffic 235 and the incoming test traffic 275 may be primarily stateless, which is to say that the outgoing test traffic 235 may be generated without expectation of any response and the incoming test traffic 275 may be received without any intention of responding. However, some amount of stateful, or interactive, communications may be required or desired between the port unit 210 and the network 290 during a test session. For example, the traffic receiver unit 280 may receive control packets, which are packets containing data necessary to control the test session, that require the port unit 210 to send an acknowledgement or response.

The traffic receiver unit 280 may separate incoming control packets from the incoming test traffic and may route the incoming control packets 282 to the port processor 212. The port processor 212 may extract the content of each control packet and may generate an appropriate response in the form of one or more outgoing control packets 216. Outgoing control packets 216 may be provided to the traffic generator unit 220. The traffic generator unit 220 may insert the outgoing control packets 216 into the outgoing test traffic 235.

Each packet generated by the traffic generator 220 may contain at least one instrumentation block, also called a test data block, containing information necessary to assess the performance of a network under test. For example, the instrumentation block may include a signature field, a packet group identifier, and a sequence number. The signature field may identify a received packet as a test packet and may be used to determine the location of the instrumentation block with the packet. The packet group identifier may identify the received packet as a member of a specific packet group or flow for accumulating test statistics. The sequence number may define the received packet's relative position within the identified packet group for determining if any packets are lost or received out-of-sequence. The instrumentation block may include other test data such as a timestamp and/or a checksum to ensure that the instrumentation block was received correctly.

Description of Processes

Figure 3:
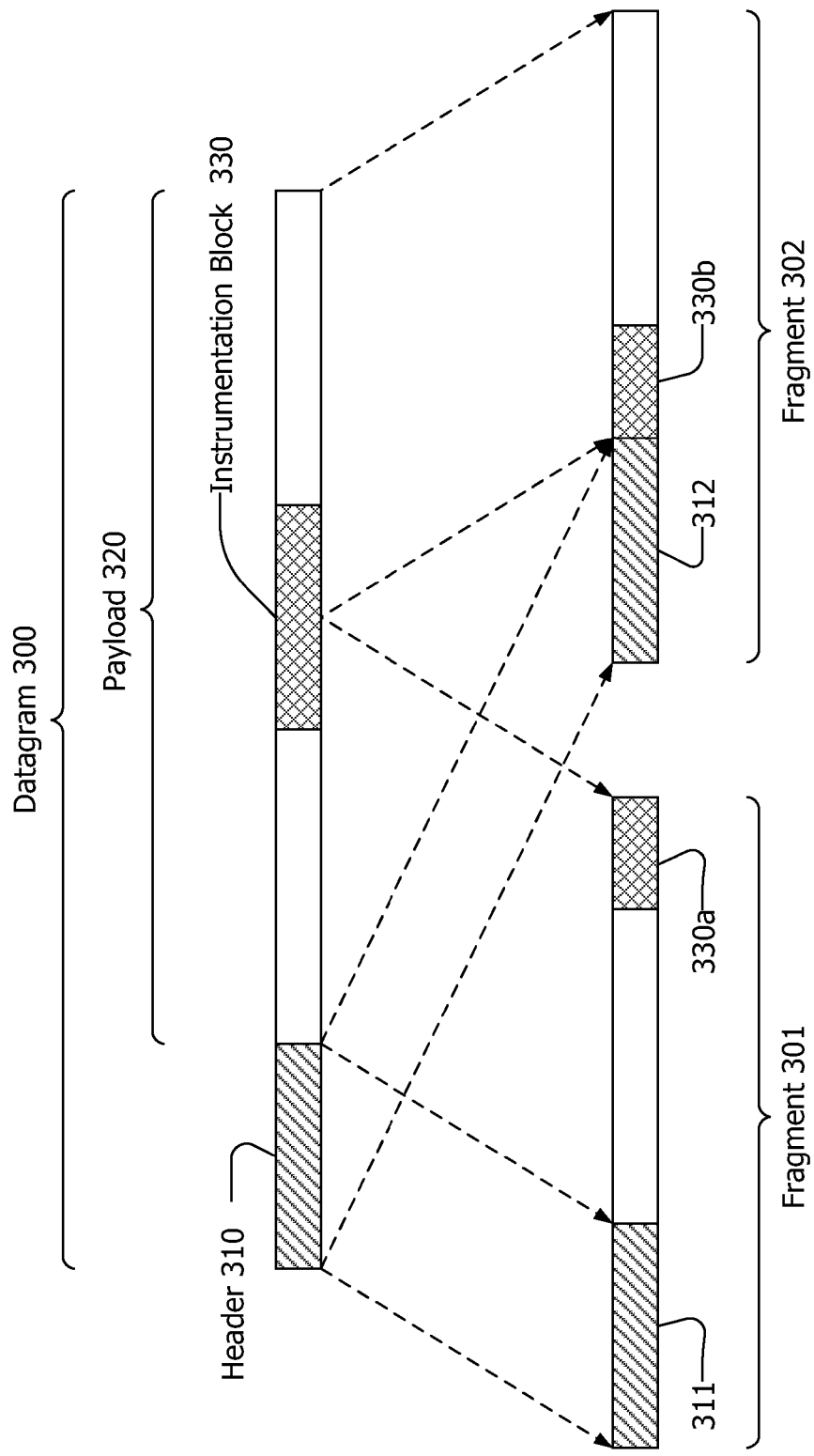
FIG. 3 is a graphical depiction of packet fragmentation.

Referring now for FIG. 3, a datagram 300 may include a header 310 and a payload 320 containing an instrumentation block 330. During transmission through a network under test, the datagram 300 may be divided into two or more fragments, such as fragments 311 and 312. When the datagram 300 is divided into fragments, the header 310 of the datagram is, for the most part, copied into the headers 311, 312 of the fragments 301, 302. Specific fields within the fragment headers 311, 312 may be populated to reflect the length of the respective fragment and the relative position of the respective fragment payloads within the original datagram. In some circumstances, a common trailer (not shown) may be copies from the end of the original datagram 300 to the end of each fragment 301, 302.

The payload 320 of the datagram 300 may be divided between the fragments 301, 302. If the original datagram 300 contains a single instrumentation block 320 as shown in FIG. 3, the instrumentation block may be divided into portions 300a, 330b split between fragments 301 and 302. Alternatively, depending on the position of the instrumentation block 330 within the datagram 300, the instrumentation block 330 may be copied wholly into fragment 301 or fragment 302. In any case, when an original datagram containing a single instrumentation block is fragmented, some or all of the resulting fragments will not contain complete instrumentation blocks.

If the fragments of a datagram are reassembled within a network, before being received at a test equipment port, there may be no need for complete instrumentation blocks within each fragment. However, fragments may be received at a test equipment port without being reassembled. For example, a test intended to confirm a network device's capability to fragment packets may require that the fragments be received by the test equipment without reassembly. In this situation, each original datagram may be generated such that each fragment contains at least one complete instrumentation block.

Figure 4:
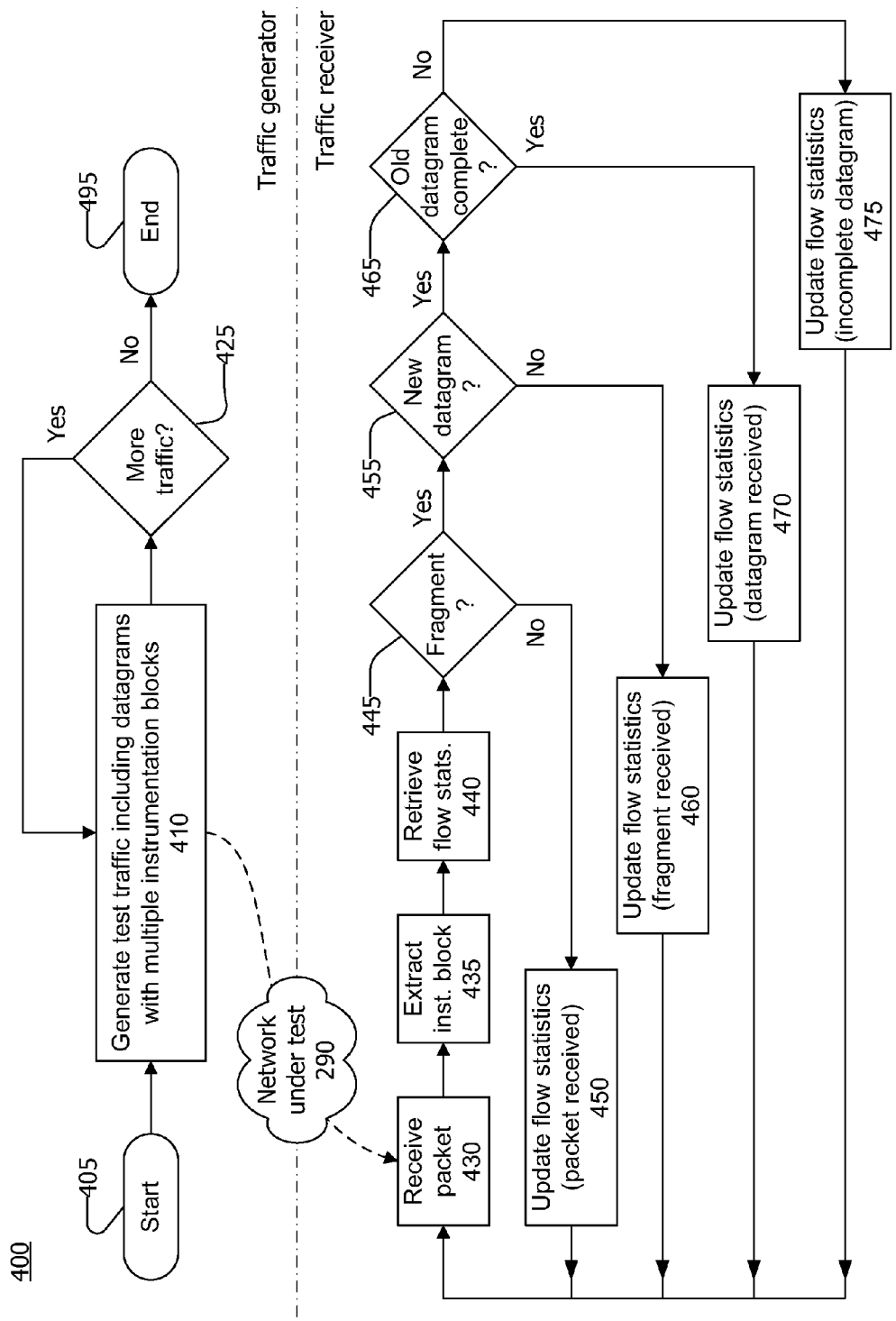
FIG. 4 is a flow chart of a method for testing packet fragmentation.

Referring now to FIG. 4, a process 400 for testing fragmentation may start at 405 and may end at 495 after a large amount of test traffic has been generated, or when stopped by an operator action (not shown in FIG. 4). The process 400 may include generating traffic using a traffic generator, such as the traffic generator 220 and receiving traffic by a traffic receiver, such as the traffic receiver 280. The process 400 may be cyclic and real-time in nature. The flow chart of FIG. 4 shows the process 400 as performed by a single traffic generator and a single traffic receiver. It should be understood that the process 400 may be performed simultaneously by pluralities of traffic generators and traffic receivers in parallel during a test session.

Prior to the start 405 of the process 400, a test session may have been designed. The test session design may be done, for example, by an operator using a test administrator computing device, such as the test administrator 205, coupled to one or more port units, such as the port unit 210. Designing the test session may include determining or defining the architecture of the network or network equipment, defining streams to be generated by each port unit during the test session, creating corresponding stream forming data, and forwarding respective stream forming data to at least one port unit.

At 410, the traffic generator may generate test traffic by forming and transmitting packets. At 415, a determination may be made whether or not more traffic should be generated. The determination may be made based upon, for example, a test session specification that defines a minimum number of packets or datagrams to be transmitted, a required duration for the test session, or some other test session completion criteria. If more traffic is not required, the test session may finish at 495. When more traffic should be generated, the process may repeat from 410. Although the actions at 410 and 415 are shown as sequential for ease of explanation, these actions may be performed concurrently. The actions at 410 and 415 may be repeated essentially continuously for the duration of a test session.

The test traffic generated at 410 may include at least some datagrams containing multiple instrumentation blocks. The multiple instrumentation blocks may incorporated into the datagrams such that, when the datagram is divided into fragments by a network under test 490, at least one complete instrumentation block will be included in each fragment. The disposition of the multiple instrumentation blocks within each datagram may depend on whether or not a payload length of the fragments is known.

Figure 5:
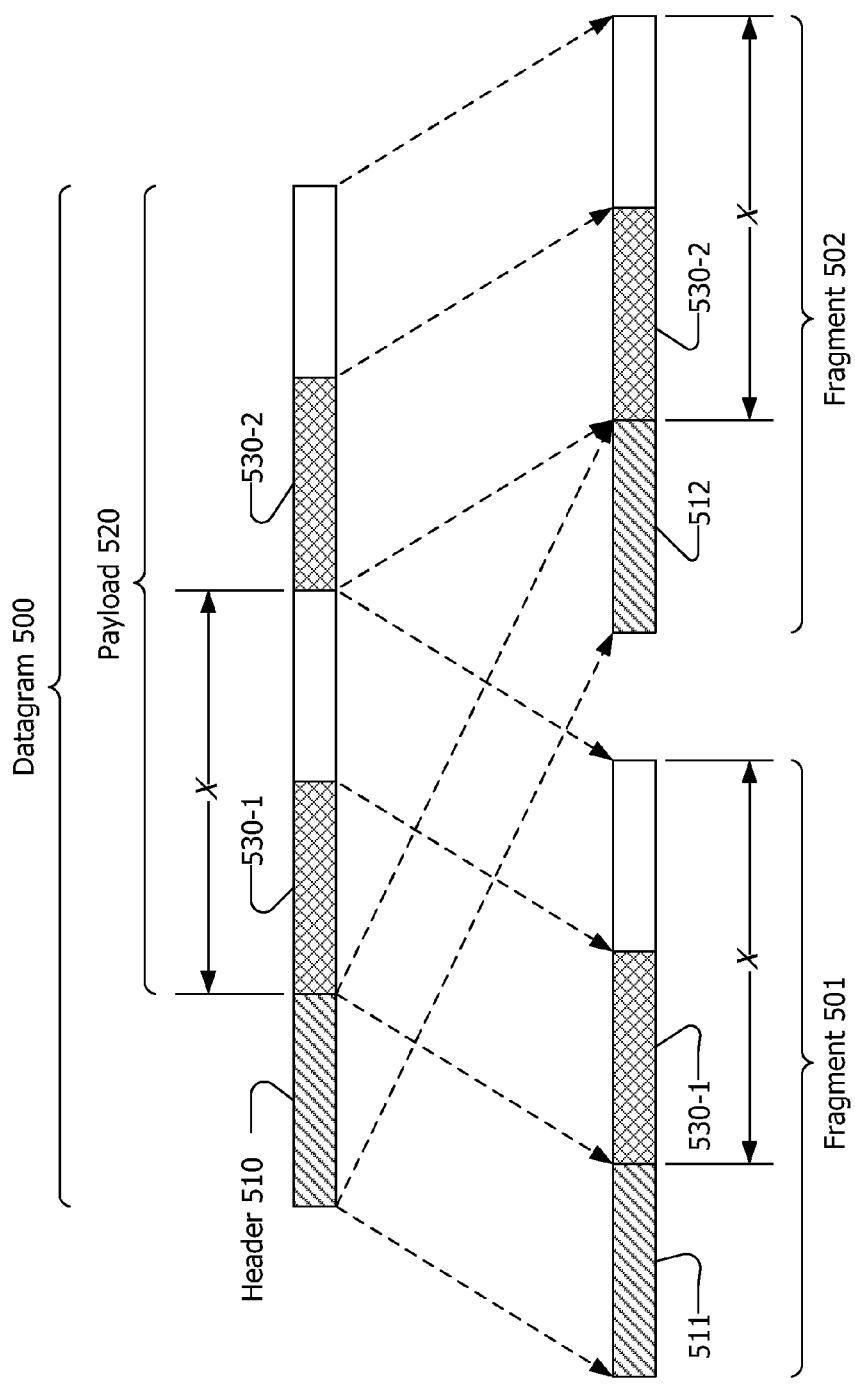
FIG. 5 is a graphical depiction of packet fragmentation.

Referring now to FIG. 5, a datagram 500 may include a header 510 and a payload 520 containing a plurality of instrumentation blocks 530-1, 530-2. While only two instrumentation blocks 530-1, 530-2 are shown, a datagram may include more than two instrumentation blocks.

During transmission through a network under test, the datagram 500 may be divided into two or more fragments, such as fragments 501 and 502. When the datagram 500 is divided into fragments, the headers 511, 512 of the fragments may be completed as previously described. The payload 520 of the datagram 500 may be divided between payload portions of fragments 501, 502. If an expected length X of the payload portions of the fragments is known, the instrumentation block 530-1, 530-2 may be disposed within the payload 520 at intervals equal to the length X. In this case, each instrumentation block 530-1, 530-2 may be copied into a respective fragment 531, 532 such that each fragment contains one complete instrumentation block. In this case, the number of fragments formed from a datagram will be equal to the datagram payload length divided by the fragment payload length, rounded up to the next integer number. The number of instrumentation blocks required in the datagram may be equal to the number of fragments to be formed from the datagram.

In some circumstances, the payload length of the fragments may be unknown when a datagram is generated. For example, a network device may convert a long data packet into fragments that can be transmitted between scheduled packets of one or more audio or video streams. In this case, the payload length of the fragments may be selected by the network device to fit into the available time between scheduled packets, and may not be constant or predictable.

Figure 6:
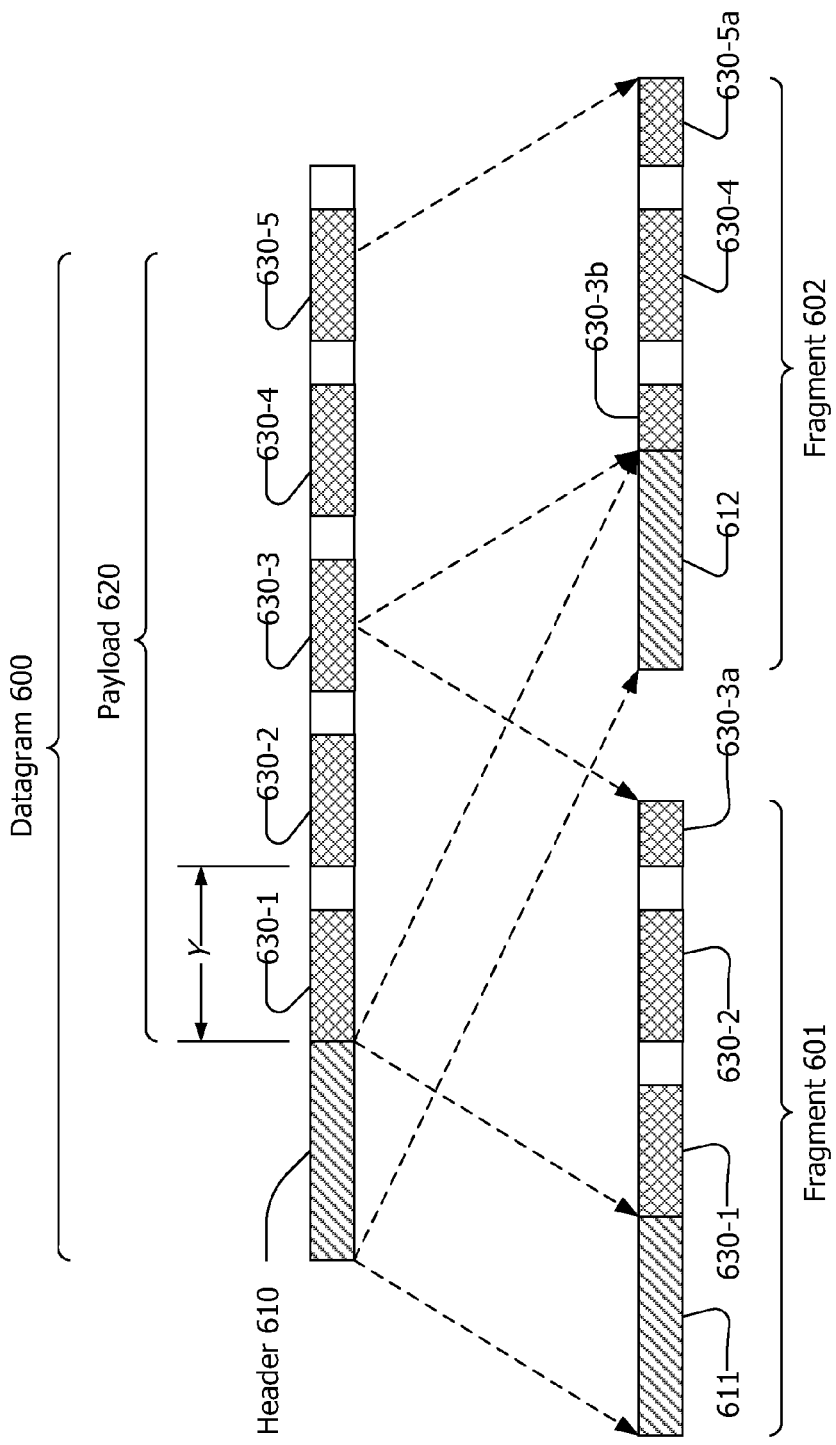
FIG. 6 is a graphical depiction of packet fragmentation.

Referring now to FIG. 6, a datagram 600 may include a header 610 and a payload 620 containing a plurality of instrumentation blocks 630-1, 630-2, 630-3, 630-4, and 630-5. While five instrumentation blocks 630-1 to 630-5 are shown in the example of FIG. 6, a datagram may include more or fewer than five instrumentation blocks.

During transmission through a network under test, the datagram 600 may be divided into two or more fragments, including fragments 601 and 602. When the datagram 600 is divided into fragments, the headers 611, 612 of the fragments may be completed as previously described. The payload 620 of the datagram 600 may be divided between payload portions of fragments 601, 602, and other fragments if needed. If an expected minimum length $X_{min}$ of the payload portions of the fragments is known, the instrumentation blocks 630-1 to 630-5 may be disposed within the payload 620 at intervals Y, where Y is less than or equal to one-half of $X_{min}$. In this case, each fragment having a payload length equal to or greater than $X_{min}$ is guaranteed to contain at least one complete instrumentation block. In the example of FIG. 6, fragment 601 contains instrumentation blocks 630-1 and 630-2 and a portion of instrumentation block 630-3. Fragment 602 contains a portion of instrumentation block 630-3, all of instrumentation block 630-4, and a portion of instrumentation block 630-5. The remaining portion of the datagram 600 may be conveyed by one or more additional fragments (not shown). Note that, while each fragment contains at least one complete instrumentation block, the position of the complete instrumentation block within the various fragments cannot be predicted.

Referring back to FIG. 4, the test traffic generated at 410, including datagrams with multiple instrumentation blocks as shown in FIG. 5 and/or FIG. 6, may be transmitted to the network under test 490. At least some datagrams included in the test traffic may be converted to fragments within the network under test 490. The test traffic, including fragments may be received by one or more traffic receivers.

Within each traffic receiver, packets may be received sequentially at 430. At 435, the traffic receiver may extract at least one instrumentation block from each packet. At 435, the traffic receiver may also count the number of instrumentations blocks found in each received packet.

Figure 7:
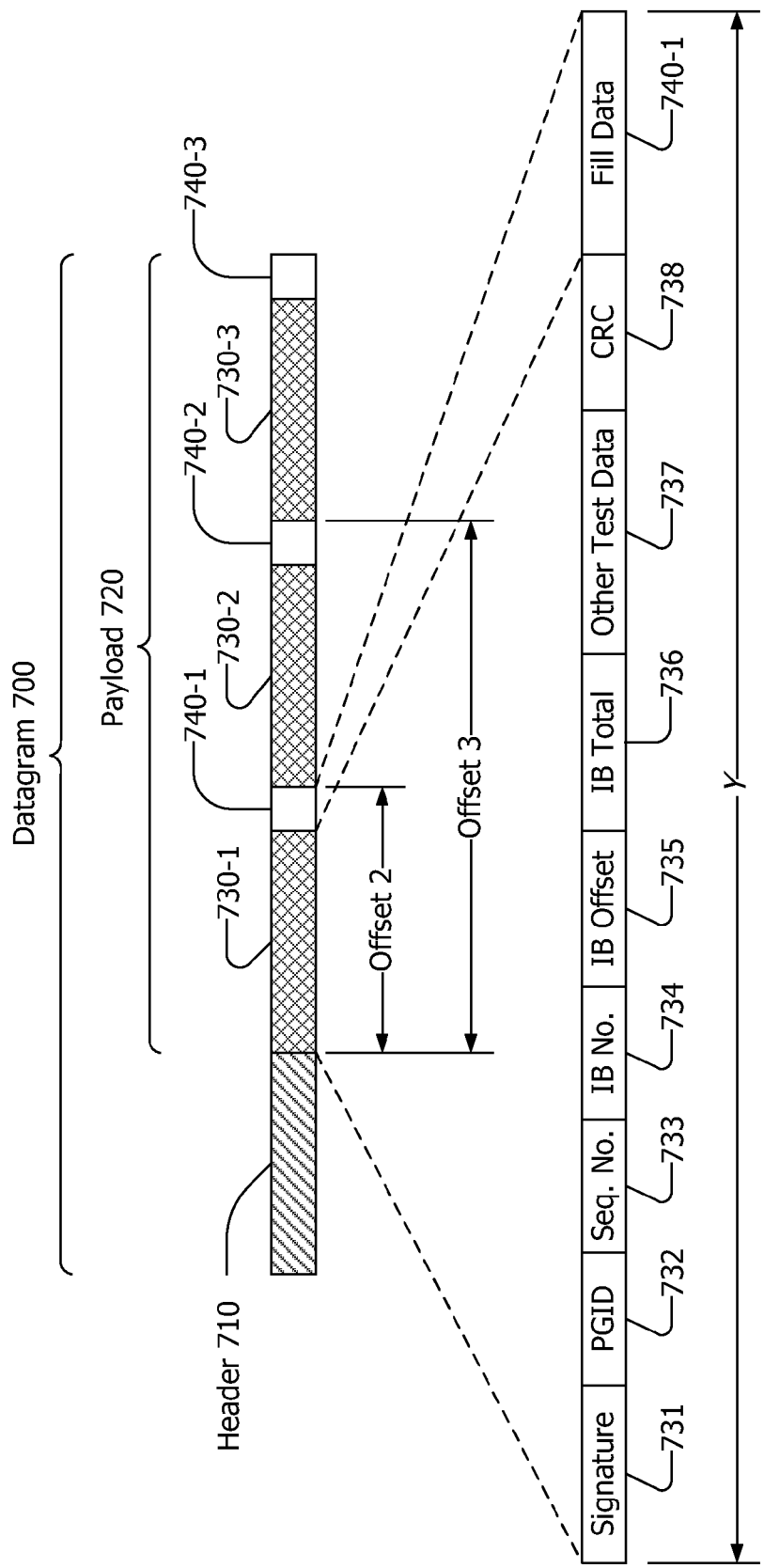
FIG. 7 is a graphic depiction of an instrumentation block.

Referring now to FIG. 7, each packet or datagram 700 generated at 410 may include one or more instrumentation blocks 730-1, 730-2, 730-3. The instrumentation block 730-1, -2, -3 may be contiguous or separated by fill data 740-1, 740-2, 740-3. The fill data 740-1, -2, -3 may be, for example, randomly generated or predetermined data inserted into the datagram 700 to maintain a required spacing between the instrumentation blocks as previously discussed. A packet or datagram may have more or fewer than the three instrumentations blocks shown in the example of FIG. 7. Each instrumentation block 730-1, -2, -3 may contain a signature field 731 used to locate the instrumentation block within the received packet. The signature field 731 may contain a predetermined value. The signature field 731, and thus the instrumentation block, may be located within a packet by conducting a floating pattern match for the predetermined value, as described in Published Patent Application US 2007/0115833 A1.

Each instrumentation block 730-1, -2, -3 may include a packet group identifier (PGID) 732 that identifies the received packet as a member of a specific packet group. Each instrumentation block may also include a packet sequence number 733 indicating the packet's position (when transmitted) within a sequence of packets constituting the packet group. Each instrumentation block may contain other test data 737, which may include a timestamp indicating a transmission time of the packet or datagram. The combination of packet group identifier 732, the sequence number 733, and the timestamp if present may be unique for each packet, including datagrams, transmitted at 410. When a datagram has been fragmented within the network under test 490, the fragments of the datagram may contain the same packet group identifier 732, sequence number 733, and timestamp.

Each instrumentation block 730-1, -2, -3 may include may include one or more fields containing data to assist a packet receiver in determining if all of the fragments of a datagram have been properly received. For example, the instrumentation blocks within a datagram may be sequentially numbered starting with the instrumentation block following the header of a datagram. Each instrumentation block may contain an instrumentation block number (IB No.) field 734 containing the respective sequential number.

Alternatively, or in addition to, an IB No. field 734, each instrumentation block may contain an IB offset field 735 indicating an offset of the instrumentation block within a datagram. In the example of FIG. 7, the IB offset is measured as the distance, in bytes or words, from the start of the payload 720 of the datagram 700 to the start of the respective instrumentation block. In this example, the IB offset for instrumentation block 730-1 is zero, the IB offset for instrumentation block 730-2 is Offset 2, and the IB offset for instrumentation block 730-3 is Offset 3. The IB offset may be measured differently. For example, the IB offset of each instrumentation block could be measured from the start of a datagram, from the start of the IP header, or in some other manner.

Each instrumentation block 730-1, -2, -3 may include an IB total field 736 indicating the total number of instrumentation blocks within a datagram. Alternatively, or in addition to, the IB total field 736, each instrumentation block may include a total payload length field (not shown) defining a total payload length of the original datagram. A packet receiver may use the IB total field 736 and/or the total payload length field to determine if all of the fragments of a datagram have been received.

Each instrumentation block 730-1, -2, -3 may also include a cyclic redundancy check (CRC) field 738 to enable a packet receiver to determine if the instrumentation block was received correctly. The CRC field 738 may be calculated over the instrumentation block only, or over the instrumentation block and adjacent fill data 740-1, -2, -3. Instead of the CRC field 738, some other field, such as a checksum field, a parity field, or an error correcting code field may be used to ensure the integrity of each instrumentation block.

Referring again to FIG. 4, after an instrumentation block is extracted from a received packet at 435, a PGID may be extracted from the instrumentation block and used to retrieve stored flow statistics for the corresponding packet group. The retrieved flow statistics may include, for example, quantitative statistics for the packet group such as a number of packets and total bytes received and the number of packets received out-of-sequence. The retrieved flow statistics may include a sequence number of the previously received packet in the packet group. The retrieved flow statistics may also include, for example, temporal statistics such as minimum, average, and maximum latency.

At 445, a determination may be made whether or not the packet received at 430 is a fragment. The determination may be made based on data contained in the instrumentation block extracted at 435, the flow statistics retrieved at 440, and/or the IP header of the received packet. For example, an IPv4 header contains a "do not fragment" flag. If this flag is set, the packet received at 430 cannot be a fragment. For further example, the instrumentation block extracted at 435 may include an IB Total field (736 in FIG. 7) indicating a total number of instrumentation blocks in the original datagram or a total length field indicating a length of the payload of the original datagram. These fields may be compared to the number of instrumentation blocks found in the received packet and/or the payload length of the received packet to determine if the received packet is the entire datagram or a fragment. The determination at 445 may be made in some other manner.

If a determination is made at 445 that the packet received at 430 is not a fragment (which is to say the packet received at 445 is complete), the flow statistics for the corresponding packet group may be updated at 450 to indicate that a complete packet was received. Updating the flow statistics at 450 may include, for example incrementing a count of the number of packets received, adding the length of the received packet to a cumulative total bytes received, incrementing a count of out-of-sequence packets if appropriate, and changing a minimum or maximum latency time if appropriate. After the flow statistics have been updated at 450, the process 400 may return to 430 to wait the reception of a next packet.

When a determination is made at 445 that the packet received at 430 is a fragment, a determination may be made at 455 is the received packet is a fragment of a new datagram, or a fragment of an "old" datagram where at least one other fragment had been previously received. The determination at 455 may be made, for example, by comparing a sequence number included in the instrumentation block extracted from the received packet at 435 and a sequence number of the previously received packet/fragment included in the flow statistics retrieved at 440. If the two sequence numbers are identical, the fragment received at 430 belongs to the same datagram as at least one previously received fragment.

When a determination is made at 455 that the fragment received at 430 belongs to the same datagram as at least one previously received fragment ("no" at 455), the flow statistics for the corresponding packet group may be updated at 460 to indicate that a specific fragment was received. For example, the instrumentation block extracted at 435 may include an IB sequence number field (734 in FIG. 7). In this case, the flow statistics retrieved at 440 may include a field to track which instrumentations blocks have been received. This field may include a plurality of one-bit flags that can be set to indicate that a corresponding instrumentation block was included in a received fragment. For further example, the instrumentation block extracted at 435 may include a total payload length for a datagram and the flow statistics retrieved at 440 may include a cumulative payload received field. In this case, the payload length of the fragment received at 430 may be added to the cumulative payload received field, and the sum may be compared to the total payload length to determine if an entire datagram has been received. After the flow statistics have been updated at 460, the process 400 may return to 430 to wait the reception of a next packet.

When a determination is made at 455 that a packet received at 430 is a fragment of a new datagram, a determination may be made at 465 whether or not the previous "old" datagram was completely received. For example, the flow statistics retrieved at 440 may include a plurality of flags that can be set to indicate that a corresponding instrumentation block was included in a received fragment. In this case, the flags may be inspected at 465 to determine if all of the expected fragments of the previous datagram were received. For further example, the instrumentation block extracted at 435 may include a total payload length for a datagram and the flow statistics retrieved at 440 may include a cumulative payload received field. In this case, the cumulative payload received field and the total payload length may be compared at 465 to determine if the entire previous datagram has been received.

When a determination is made at 465 that the previous datagram was completely received, the flow statistics may be updated at 470 to indicate the previous datagram was received correctly and to indicate a fragment of a new datagram has been received. Updating the flow statistic may include, for example, incrementing a count of the number of packets/datagrams received, adding the length of the previous datagram to a cumulative total bytes received, incrementing a count of out-of-sequence packets if appropriate, and changing a minimum or maximum latency time if appropriate. Updating the flow statistics at 470 may also include resetting a plurality of flags to indicate only one fragment of a new datagram has been received and/or setting a cumulative payload received field to equal the length of payload of the fragment of the new datagram. After the flow statistics have been updated at 470, the process 400 may return to 430 to wait the reception of a next packet.

When a determination is made at 465 that the previous datagram was not completely received, the flow statistics may be updated at 475 to indicate the previous datagram was not received correctly and to indicate a fragment of a new datagram has been received. Updating the flow statistics may include, for example, incrementing a count of a number of datagrams with missing fragments. Updating the flow statistics at 475 may also include resetting a plurality of flags to indicate only one fragment of a new datagram has been received and/or setting a cumulative payload received field to equal the length of payload of the fragment of the new datagram. After the flow statistics have been updated at 475, the process 400 may return to 430 to wait the reception of a next packet.

Although not shown in FIG. 4, when a determination is made at 465 that the previous data gram was not received correctly, a capture operation may be triggered to save previously received packets, including the fragments of the previous datagram, for further analysis.

Figure 8:
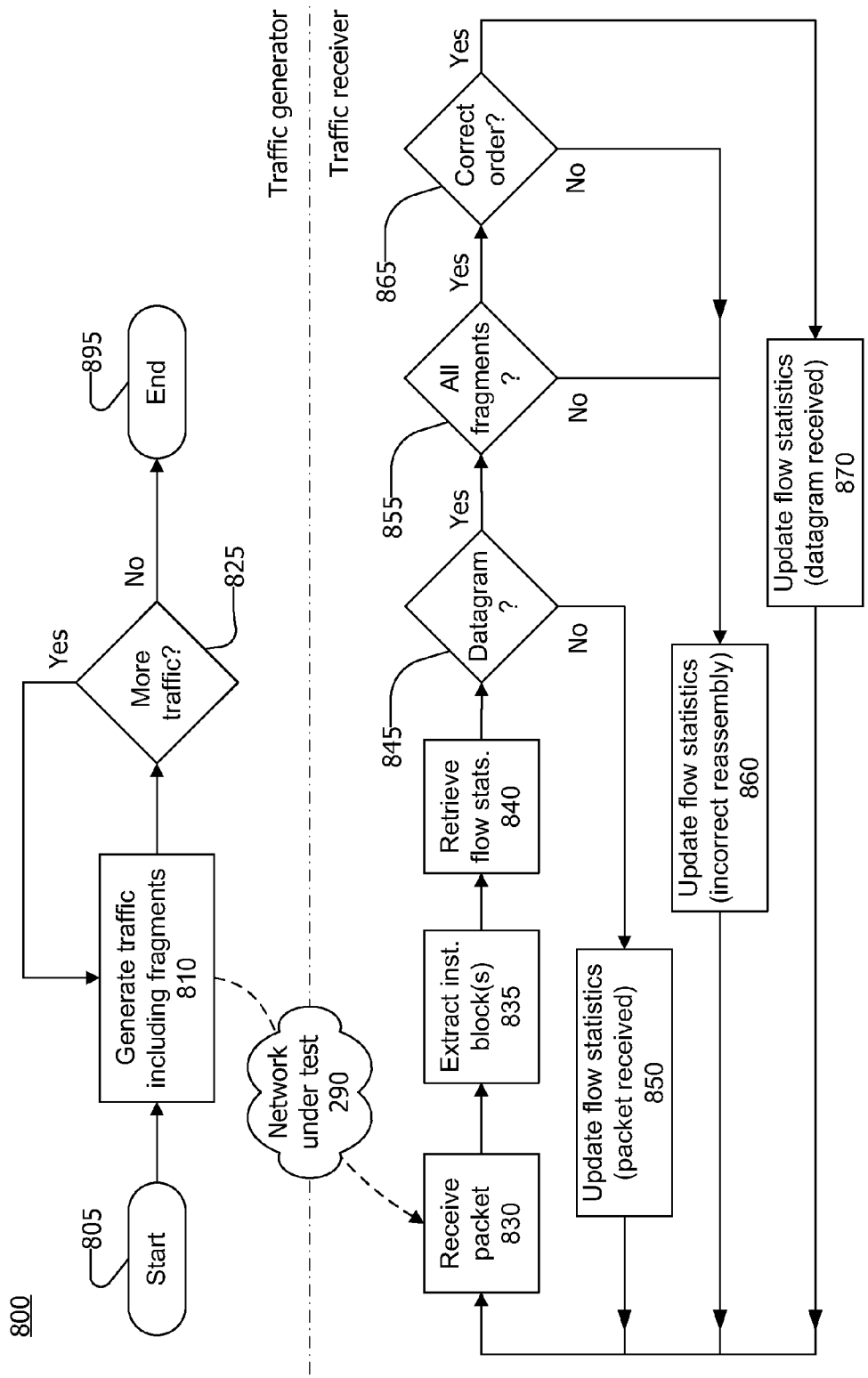
FIG. 8 is a flow chart of a method for testing packet reassembly.

Referring now to FIG. 8, a process 800 for testing reassembly may start at 805 and may end at 895 after a large amount of test traffic has been generated, or when stopped by an operator action (not shown in FIG. 8). The process 800 may include generating traffic using a traffic generator, such as the traffic generator 220 and receiving traffic by a traffic receiver, such as the traffic receiver 280. The process 800 may be cyclic and real-time in nature. The flow chart of FIG. 8 shows the process 800 as performed by a single traffic generator and a single traffic receiver. It should be understood that the process 800 may be performed simultaneously by pluralities of traffic generators and traffic receivers in parallel during a test session.

Prior to the start 805 of the process 800, a test session may have been designed. The test session design may be done, for example, by an operator using a test administrator computing device, such as the test administrator 205, coupled to one or more port units, such as the port unit 210. Designing the test session may include determining or defining the architecture of the network or network equipment, defining streams to be generated by each port unit during the test session, creating corresponding stream forming data, and forwarding respective stream forming data to at least one port unit.

At 810, the traffic generator may generate test traffic by forming and transmitting packets including at least some fragments to be reassembled by the network under test 190. At 815, a determination may be made whether or not more traffic should be generated. The determination may be made based upon, for example, a test session specification that defines a minimum number of packets or fragments to be transmitted, a required duration for the test session, or some other test session completion criteria. If more traffic is not required, the test session may finish at 895. When more traffic should be generated, the process may repeat from 810. Although the actions at 810 and 815 are shown as sequential for ease of explanation, these actions may be performed concurrently. The actions at 810 and 815 may be repeated essentially continuously for the duration of a test session.

Figure 9:
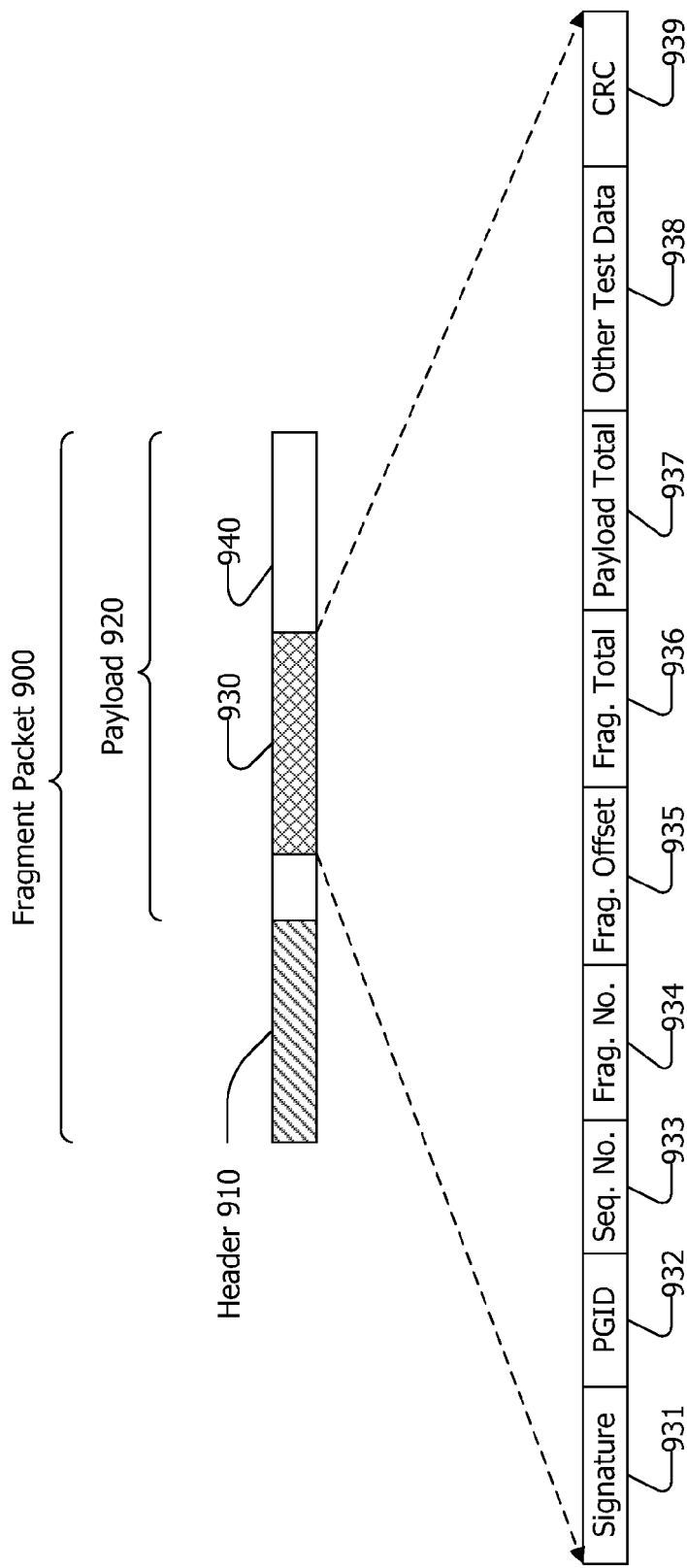
FIG. 9 is a graphic depiction of an instrumentation block.

The test traffic generated at 810 may include at least some fragments to be reassembled. Referring now to FIG. 9, each fragment packet 900 may include a header portion 910 and a payload portion 920 including an instrumentation block 930. The instrumentation block 930 may include a signature field 931, a PGID field 932, a sequence number field 933, other test data 938 and a CRC field 939, all as previously described in conjunction with FIG. 7. The signature field 931, the PGID field 932, and the sequence number field 933 may be identical for all fragments to be combined into a single datagram.

The instrumentation block 930 may also include fields indicative of where each fragment should be positioned within a reassembled datagram. For example, the instrumentation block 930 of each fragment may include a fragment number field 934 indicating an expected position of the fragment in a sequence of fragments that make up a reassembled datagram. The instrumentation block 930 of each fragment may include a fragment offset field 934 indicating an expected position of the fragment with respect to a reference point within the reassembled datagram. The fragment offset may be measured, for example, in bytes from the start of the datagram payload (as shown in FIG. 7), from the start of the datagram, from the start of an IP header, or in some other manner.

The instrumentation block 930 may also include fields indicative of how many fragments are expected within a complete reassembled datagram. For example, the instrumentation block 930 of each fragment may include a fragment total field 936 indicating the total number of fragments required to make up a complete reassembled datagram. The instrumentation block 930 of each fragment may include a payload total field 937 indicating the expected total payload length of the reassembled datagram.

Returning to FIG. 8, the test traffic generated at 810, including fragments, may be transmitted to the network under test 890. At least some datagrams may be reassembled by the network under test 890 from fragments included in the test traffic. The test traffic, including reassembled datagrams may be received by one or more traffic receivers.

Within each traffic receiver, packets may be received sequentially at 830. At 835, the traffic receiver may extract one or more instrumentation blocks from each packet. At 835, the traffic receiver may extract part or all of every instrumentation block found in each received packet.

After one or more instrumentation blocks are extracted from a received packet at 835, a PGID may be extracted from one instrumentation block (for example, the first instrumentation block if a plurality of instruments blocks are extracted at 835) and used at 840 to retrieve stored flow statistics for the corresponding packet group. The flow statistics retrieved at 840 may include, for example, quantitative statistics for the packet group such as a number of packets and total bytes received and the number of packets received out-of-sequence. The retrieved flow statistics may include a sequence number of the previously received packet in the packet group. The retrieved flow statistics may also include, for example, temporal statistics such as minimum, average, and maximum latency.

At 845, a determination may be made whether or not the packet received at 830 is a datagram reassembled from two or more fragments. The determination may be made based on data contained in the instrumentation block extracted at 835. For example, if the instrumentation block extracted at 835 includes an IB Total field indicating the expected total number of instrumentation blocks is one, then the received packet is not a reassembled datagram.

If a determination is made at 845 that the packet received at 830 is not a reassembled datagram, the flow statistics for the corresponding packet group may be updated at 850 to indicate that a complete packet was received. Updating the flow statistics at 850 may include, for example incrementing a count of the number of packets received, adding the length of the received packet to a cumulative total bytes received, incrementing a count of out-of-sequence packets if appropriate, and changing a minimum or maximum latency time if appropriate. After the flow statistics have been updated at 850, the process 800 may return to 830 to wait the reception of a next packet.

When a determination is made at 845 that the packet received at 830 is a reassembled datagram, a determination may be made at 855 if the expected number of fragments were incorporated into the datagram as it was reassembled by the network under test 190. The determination at 855 may be made, for example, by comparing a number of instrumentation blocks extracted at 835 and a fragment total field (936 in FIG. 9) indicating the expected number of fragments. The determination at 855 may be made by comparing a payload length of the packet received at 830 and a payload total field (937 in FIG. 9) indicating the expected payload length of the reassembled datagram. At 855, the plurality of instrumentation blocks extracted at 835 may also be compared to that the PGIDs and sequence numbers within the instrumentation blocks are respectively equal. If the PGID and/or sequence numbers are not equal for all instrumentations block, the packet received at 830 may have been reassembled from fragments of more than one datagram.

When a determination is made at 855 that the datagram received at 430 does not include the expect number of fragments, or includes fragments from more than one datagram, the flow statistics for the corresponding packet group may be updated at 960 to indicate that an incorrectly reassembled datagram was received. After the flow statistics have been updated at 860, the process 800 may return to 830 to wait the reception of a next packet.

When a determination is made at 855 that a datagram received at 830 includes the expected number of fragments, a determination may be made at whether or not the fragments were reassembled in the correct order. For example, at 865, fragment number fields (934 in FIG. 9) and/or fragments offset fields (935 in FIG. 9) within each instrumentation block extracted at 835 may be compared to determine if the instrumentation blocks were correctly ordered in the reassembled datagram.

When a determination is made at 865 that the datagram received at 830 contains one or more fragments that are not in the correct sequence within the datagram, flow statistics may be updated at 860 to indicate that an incorrectly reassembled datagram has been received. When a determination is made at 865 that the datagram received at 830 has all of the expected fragments in the correct sequence within the datagram, the flow statistics may be updated at 870 to indicate that a correctly reassembled datagram has been received. After the flow statistics have been updated at 860 or 870, the process 800 may return to 830 to wait the reception of a next packet.

Although not shown in FIG. 8, when a determination is made at 855 or 865 that the received datagram was incorrectly reassembled, a capture operation may be triggered to save previously received packets, including the incorrectly reassembled datagram, for further analysis.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or"

It is claimed:

1. A method for testing a network that converts datagrams into fragments, wherein a minimum fragment payload length is known, the method comprising:
   a traffic generator generating a datagram, a payload of the datagram containing plural instrumentation blocks, each of the plural instrumentation blocks containing information identifying the datagram and information identifying the location of each instrumentation block within the datagram, the plural instrumentation blocks disposed within the payload of the datagram at intervals less than or equal to one-half of the minimum fragment payload length; and
   the traffic generator transmitting the datagram over the network.

2. The method of claim 1, wherein the information identifying the datagram includes a packet group identifier and a packet sequence number.

3. The method of claim 1, wherein the information identifying the location of the instrumentation block within the datagram includes at least one of an instrumentation block sequence number and an instrumentation block offset.

4. The method of claim 1, wherein each of the plural instrumentation blocks contains information indicating at least one of a total number of instrumentation blocks within the datagram and a payload length of the datagram.

5. The method of claim 1, further comprising:
   a packet receiver receiving a plurality of fragments derived from the datagram;
   the packet receiver determining if the received fragments constitute the complete datagram based, at least in part, on data within respective instrumentation blocks extracted from each received fragment; and
   the packet receiver accumulating and reporting test statistics indicative of a number of complete datagrams received and a number of incomplete datagrams received.

6. An apparatus for testing a network that converts datagrams into fragments, wherein a minimum fragment payload length is known, the apparatus comprising:
   a traffic generator configured to generate a datagram and to transmit the datagram over the network,
   wherein a payload of the datagram contains plural instrumentation blocks, each of the plural instrumentation blocks containing information identifying the datagram and information identifying the location of each instrumentation block within the datagram, the plural instrumentation blocks disposed within the payload of the datagram at intervals less than or equal to one-half of the minimum fragment payload length.

7. The apparatus of claim 6, wherein the information identifying the datagram includes a packet group identifier and a packet sequence number.

8. The apparatus of claim 6, wherein the information identifying the location of the instrumentation block within the datagram includes at least one of an instrumentation block sequence number and an instrumentation block offset.

9. The apparatus of claim 6, wherein each of the plural instrumentation blocks contains information indicating at least one of the total number of instrumentation blocks within the datagram and the payload length of the datagram.

10. The apparatus of claim 6, further comprising:
    a packet receiver configured to:
       receive a plurality fragments derived from the datagram,
       determine if the received fragments constitute the complete datagram based, at least in part, on data within respective instrumentation blocks extracted from each received fragment, and
       accumulate and report test statistics indicative of a number of complete datagrams received and a number of incomplete datagrams received.

11. A non-transitory machine readable storage media containing configuration data which, when used to configure a programmable hardware device, causes the programmable hardware device to be configured to include:
    a traffic generator configured to generate a datagram and to transmit the datagram over the network,
    wherein a payload of the datagram contains plural instrumentation blocks, each of the plural instrumentation blocks containing information identifying the datagram and information identifying the location of each instrumentation block within the datagram, the plural instrumentation blocks disposed within the payload of the datagram at intervals less than or equal to one-half of a predetermined minimum fragment payload length.

12. The non-transitory machine readable storage media of claim 11, wherein the information identifying the datagram includes a packet group identifier and a packet sequence number.

13. The non-transitory machine readable storage media of claim 11, wherein the information identifying the location of the instrumentation block within the datagram includes at least one of an instrumentation block sequence number and an instrumentation block offset.

14. The non-transitory machine readable storage media of claim 11, wherein each of the plural instrumentation blocks contains information indicating at least one of the total number of instrumentation blocks within the datagram and the payload length of the datagram.

15. The non-transitory machine readable storage media of claim 11, the programmable hardware device further including:
    a packet receiver configured to;
       receive a plurality fragments derived from the datagram,
       determine if the received fragments constitute the complete datagram based, at least in part, on data within respective instrumentation blocks extracted from each received fragment, and
       accumulate and report test statistics indicative of a number of complete datagrams received and a number of incomplete datagrams received.

* * * * *

UNITED STATES PATENT AND TRADEMARK OFFICE
CERTIFICATE OF CORRECTION

PATENT NO. : 8,571,032 B2  
APPLICATION NO. : 12/948567  
DATED : October 29, 2013  
INVENTOR(S) : Alon Regev It is certified that error appears in the above-identified patent and that said Letters Patent is hereby corrected as shown below:

In the Specification

Column 1, Lines 16-18 RELATED APPLICATION INFORMATION: replace "This application is related to a copending patent application entitled TESTING FRAGMENT REASSEMBLY filed on the same date as the present application." with -- This application is related to Application No. 12/948,582, filed November 17, 2010, entitled TESTING PACKET REASSEMBLY, published as US 2012/0120820 A1. --

Signed and Sealed this  
Thirty-first Day of December, 2013

Margaret A. Focarino  
*Commissioner for Patents of the United States Patent and Trademark Office*